(No Model.)
G. R. PEARE.
LOCKING DEVICE FOR CARRIAGES.
No. 369,732. Patented Sept. 13, 1887.
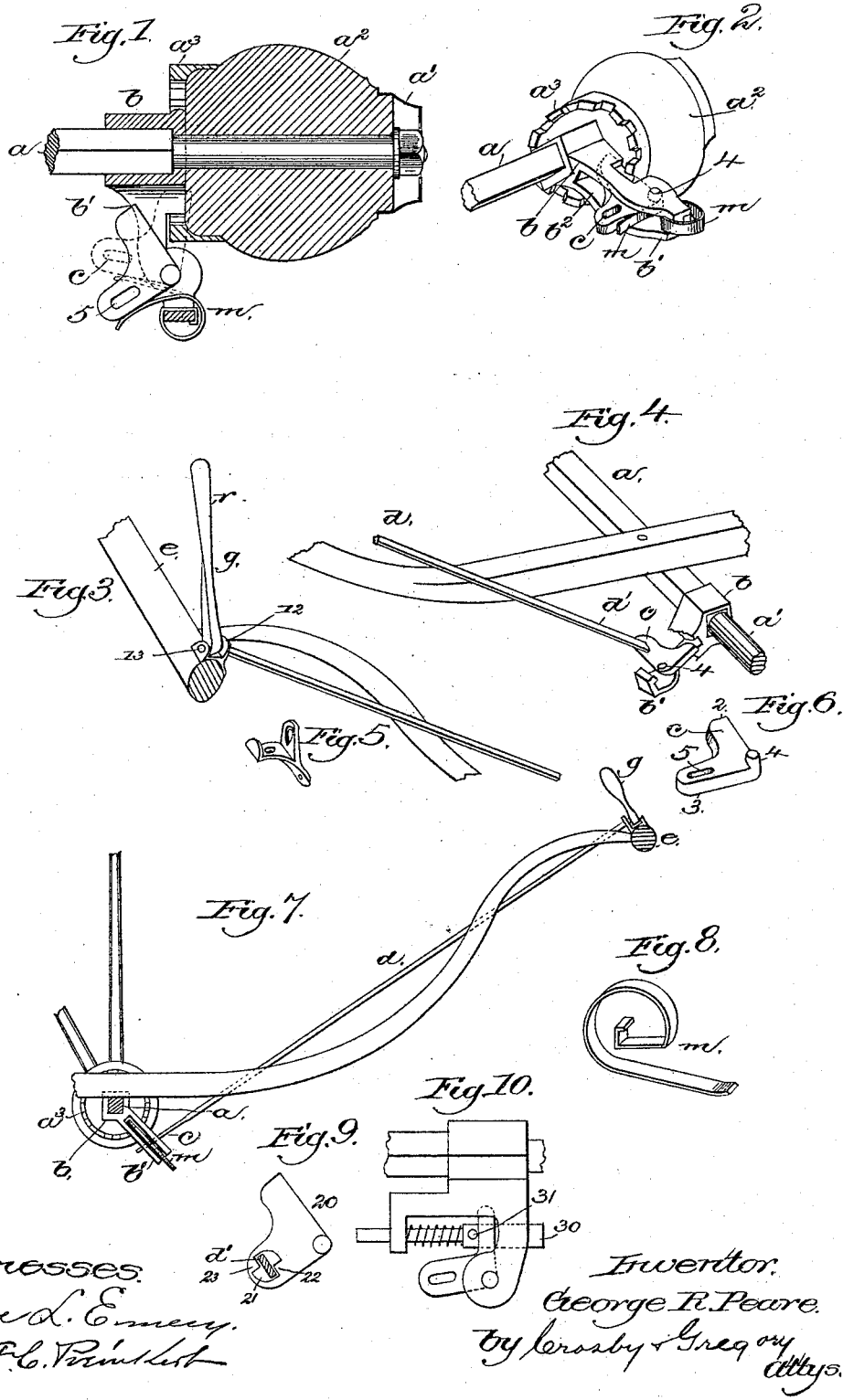

UNITED STATES PATENT OFFICE.

GEORGE R. PEARE, OF LYNN, MASSACHUSETTS.

LOCKING DEVICE FOR CARRIAGES.

SPECIFICATION forming part of Letters Patent No. 369,732, dated September 13, 1887.

Application filed November 29, 1886. Serial No. 220,206. (No model.)

*To all whom it may concern:*

Be it known that I, GEORGE R. PEARE, of Lynn, county of Essex, and State of Massachusetts, have invented an Improvement in Locking Devices for Carriages, of which the following description, in connection with the accompanying drawings, is a specification, like letters on the drawings representing like parts.

This invention has for its object to construct a locking device for locking the wheel or wheels of a carriage, the invention being especially applicable to children's carriages, wherein the means employed for operating the locking devices are placed upon or adjacent to the propeller-handle.

The invention consists in the combination, with a wheel the hub of which is supplied with a toothed band or ring and a pivoted latch normally engaging the teeth of said band or ring, of a rotatable rod or shaft for moving the latch on its pivot and means for rotating the rod or shaft. The latch is preferably retained in engagement with the teeth formed upon the hub by a spring. One end of the rotatable rod or shaft is connected with the pivoted latch, and the opposite end turns in a bearing located upon the propeller-handle of the carriage.

The means herein shown, and which I prefer to use, for rotating the rod or shaft to move the latch on its pivot consists of an upright lever or handle secured to that end of the rod or shaft adjacent to or upon the propeller-handle, and such upright lever is adapted to be moved toward the propeller-handle by pressure of the handle upon it, to thereby rotate the rod or shaft, turning the latch on its pivot, and disengaging it from the teeth of the hub.

Figure 1 shows in vertical section the hub of the wheel having a series of teeth and a bearing for the pivoted latch, which latter is shown in elevation; Fig. 2, a perspective view of the parts shown in Fig. 1; Fig. 3, a perspective view of a portion of the propeller-handle and the rotatable rod or shaft and means for moving it; Fig. 4, a perspective view of the axle-tree, pivoted latch and bearing therefor, and a portion of the rotatable rod; Fig. 5, a perspective view of the bearing for the rod secured to the propeller-handle; Fig. 6, a perspective detail of the latch; Fig. 7, a rear side view of a portion of the wheel provided with a locking device embodying this invention; Fig. 8, a detail of the spring which controls the movement of the latch; and Figs. 9 and 10, modifications, to be referred to.

The axle-tree $a$ has an arm, $a'$, upon which turns the hub $a^2$ of any suitable wheel, all as usual. To the rear side of the hub $a^2$ of the wheel a metallic toothed band or ring, $a^3$, is secured, the teeth being cut or formed at the rear or outer edge of the band, as best shown in Fig. 2; but it is obvious that the teeth may be formed directly upon the hub, or the hub may be provided with a series of notches or sockets for this purpose.

A sleeve, $b$, is slipped upon the axle-tree $a$, such sleeve having an arm, $b'$, projecting from it, which is slotted or recessed, as at $b^2$, Fig. 2, to receive a latch, $c$, shown as a flat piece of metal having the engaging-arm 2 and an actuating-arm, 3, at right angles with relation to each other, like unto a bell-crank lever, and a lug or projection, 4, rises from one side of the latch at the point of junction of the two arms.

The material of the latch at that side opposite the lug 4 is beveled off, as at 34, (see Fig. 6,) to permit the said latch to be wedged or sprung into the slot or recess cut in the arm $b$, that the lug may enter a suitable socket therein to receive it.

The actuating-arm 3 of the latch is slotted, as at 5, Fig. 6, to receive the flattened end $d'$ of a rod or shaft, $d$, which extends upward from the latch to the propeller-handle or bar $e$, at which point it has its bearing in a bearing block or frame, $f$.

As the distance between the latch and propeller-handle varies somewhat in carriages of different styles and makes, the rod $d$ is made of sufficient length to compensate for the many different styles, and it is therefore preferred to attach the said rod to the carriage loosely in the following manner: The rod is first passed through a slotted ear, 12, rising from the frame $f$ sufficiently to permit the outer side of the upright lever $g$, which is secured to the end of the said rod $d$, to enter between the said slotted ear 12 at one end of the frame $f$ and the lug or ear 13 at the other end of the frame. The rod $d$ is then sprung sufficiently to permit the flat end $d'$ to enter the slot 5 of the latch $c$. The frame $f$ is curved to conform to the shape of the propeller-handle $e$, and is screwed or otherwise secured to said handle, and when provided with the ears 12 13, as above described, gives a very serviceable bearing for one end of the rod or shaft $d$, the opposite end of the said rod or shaft entering the slot 5 of the latch $c$, as above described, to thereby obtain a bearing. The lever $g$ is normally in upright position, but adapted to be depressed toward the propeller-handle $e$, preferably in line therewith, to rotate the rod or shaft $d$, and by such rotation effect the movement of the latch $c$ on its pivot, disengaging the arm 2 of the latch from the teeth formed upon the hub in which it is normally pressed by the flat spring $m$. The arm $b$ is extended outward and slotted sufficiently to form a bearing or point of attachment for the spring $m$, which is shaped as shown in Fig. 8, comprising the bent end portion, which partially encircles the end of the arm $b$, and the flat bearing portion, which bears against the actuating portion 3 of the latch.

By the devices above enumerated it will be observed that a very simple and efficient locking device is provided, which may be operated by very slight pressure of the hand to release the latch and permit the wheel to be rotated freely, and which will automatically engage the wheel to prevent its rotation whenever the hand is removed from the lever $g$.

In Fig. 9 I have shown a pivoted latch one arm of which, as 20, has a somewhat circular recess or opening, 21, provided at each side with an inwardly-projecting wedge-shaped point, 22 23, so that the flat end $d'$ of the rotatable rod or shaft $d$ when inserted in the recess 21 can be turned to so bear against the projecting points 22 23 as to move the said latch in one or the other direction.

The operation of the latch shown in Fig. 9 is the same as above described under ordinary circumstances; but should the spring be broken the hand-lever employed to rotate the rod $d$ will lie normally upon or against the propeller-handle $e$, extending in one direction from the rod $d$; but when it is desired to move the latter positively the hand-lever is lifted and turned over to lie against the propeller-handle $e$, thereby extending from the rod $d$ in the opposite direction. It will be seen that in accomplishing this result the rod $d$ is rotated one-half a rotation, and as it is only necessary to move the latch $c$ a short distance—as, for instance, less than a quarter of a revolution—the circular opening 21, shaped as obvious, permits such lost motion to be obtained, thus enabling the carriage to be locked positively in case the spring should be broken.

In Fig. 10 I have shown a laterally-movable spring-controlled latch, 30, provided with a pin or stud, 31, against which one arm of the pivoted latch or bell-crank lever or frame, as it may be turned, bears, which bell-crank lever is turned by the rotatable rod or shaft $d$, as above set forth.

As another modification, the rod $d$ may have its bearing in a frame—as, for instance, in the frame $f$—secured to the under side of the propeller-bar, in which instance the lever $g$ will hang by gravity and normally keep the latch in engagement without the employment of a spring for the latch, the said lever $g$ being moved toward the propeller-bar to turn the rod $d$.

Prior to my invention I am aware that a hub has been provided at its inner end with teeth engaged by a latch; but prior to my invention such latch has never been placed under control of the person using the carriage, as in the invention herein described.

I claim—

1. The hub of the wheel having a series of teeth and a pivoted latch for engaging said teeth, combined with a rotatable rod one end of which engages and moves the said latch, substantially as described.

2. The hub of the wheel having a series of teeth and a pivoted latch engaging said teeth, combined with a rotatable rod one end of which engages and moves the said latch, and means, substantially as described, located adjacent to or upon the propeller-bar, for rotating the rod or shaft, substantially as described.

3. The hub of the wheel having one or more teeth formed thereon, the pivoted latch engaging the said tooth or teeth, the rotatable rod for moving the latch, and means for rotating the rod, combined with the bearing-frame $f$, having the slotted ear 12 and an ear, 13, all substantially as described.

4. The hub of the wheel having one or more teeth formed thereon, the sleeve $b$, and the slotted or recessed arm $b'$, constructed substantially as described, combined with the pivoted latch having the beveled portion 34 opposite the said pivot, all substantially as described.

5. The hub of the wheel having one or more teeth formed thereon, the sleeve $b$, and the slotted or recessed arm $b'$, constructed substantially as described, combined with the pivoted latch having the beveled portions 34 opposite the said pivot, and a spring, $m$, for normally retaining the latch $c$ in engagement with the hub, all substantially as described.

6. The hub having one or more teeth formed on it, the pivoted latch comprising the engaging-arm 2 and the actuating-arm 3, provided with the slot 5, combined with the rotatable rod or shaft $d$, having the flat end portion, $d'$, to loosely enter the slot 5 of the latch, substantially as described.

In testimony whereof I have signed my name to this specification in the presence of two subscribing witnesses.

GEO. R. PEARE.

Witnesses:
BERNICE J. NOYES,
F. CUTTER.